United States Patent
Korten et al.

(10) Patent No.: US 11,202,694 B2
(45) Date of Patent: Dec. 21, 2021

(54) METHOD OF MAKING A DENTAL ARTICLES

(71) Applicant: 3M INNOVATIVE PROPERTIES COMPANY, St. Paul, MN (US)

(72) Inventors: Malte Korten, Moorenweis (DE); Helmar B. Mayr, Kaufering (DE); Gioacchino Raia, Turkenfeld (DE); Daniel D. Oberpertinger, Erling-Adecha (DE); Martin Goetzinger, Pflugdorf (DE); Peter Bissinger, Diessen (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 318 days.

(21) Appl. No.: 15/744,930

(22) PCT Filed: Jul. 11, 2016

(86) PCT No.: PCT/US2016/041747
§ 371 (c)(1),
(2) Date: Jan. 15, 2018

(87) PCT Pub. No.: WO2017/011388
PCT Pub. Date: Jan. 19, 2017

(65) Prior Publication Data
US 2018/0206952 A1    Jul. 26, 2018

(30) Foreign Application Priority Data

Jul. 16, 2015 (EP) .................................... 15176963

(51) Int. Cl.
*A61C 13/00* (2006.01)
*B33Y 30/00* (2015.01)
(Continued)

(52) U.S. Cl.
CPC ...... *A61C 13/0022* (2013.01); *A61C 13/0013* (2013.01); *A61C 13/0019* (2013.01);
(Continued)

(58) Field of Classification Search
CPC ............ A61C 13/0022; A61C 13/0013; A61C 13/0019
See application file for complete search history.

(56) References Cited

U.S. PATENT DOCUMENTS 4,684,862 A    8/1987    Roehrle
5,151,044 A    9/1992    Rotsaert
(Continued)

FOREIGN PATENT DOCUMENTS

DE        19944130      4/2001
WO    WO 2002-09612    2/2002
(Continued)

OTHER PUBLICATIONS

International Search Report for PCT International Application No. PCT/US2016/041747, dated Nov. 2, 2016, 5 pages.

*Primary Examiner* — Yung-Sheng M Tsui
(74) *Attorney, Agent, or Firm* — 3M Innovative Properties Company

(57) ABSTRACT

A method of making a dental article, has steps of (i) providing a layer of sinter powder, (ii) providing a solidifiable binder to form a circumferential fixation zone (114) which encloses a portion of the powder layer. The method further has the step of repeating steps (i) and (ii) with each fixation zone (114) of one layer being in contact with a fixation zone (114) of an adjacent layer such that a plurality of the fixation zones (114) together form a coherent hollow sleeve (116) extending across the layers. The corresponding plurality of powder portions in combination form a contiguous batch (118) of powder captured in the sleeve. The
(Continued)

method facilitates the manufacturing of sintered dental articles.

14 Claims, 5 Drawing Sheets

(51) Int. Cl.
  *B29C 64/20* (2017.01)
  *B29C 64/165* (2017.01)
(52) U.S. Cl.
  CPC ........ *A61C 13/0004* (2013.01); *B29C 64/165* (2017.08); *B29C 64/20* (2017.08); *B33Y 30/00* (2014.12)

(56) References Cited

U.S. PATENT DOCUMENTS

| | | | |
|---|---|---|---|
| 6,048,954 A * | 4/2000 | Barlow | C04B 35/63444 526/328.5 |
| 6,955,776 B1 * | 10/2005 | Feenstra | A61K 6/17 264/16 |
| 7,686,989 B2 * | 3/2010 | Van der Zel | A61C 13/082 264/20 |
| 2009/0148813 A1 | 6/2009 | Sun et al. | |
| 2011/0190446 A1 | 8/2011 | Matsui et al. | |
| 2012/0308837 A1 | 12/2012 | Schlechtriemen | |
| 2015/0297349 A1 * | 10/2015 | Butscher | B29C 64/165 623/23.61 |
| 2017/0056138 A1 * | 3/2017 | Zandinejad | B29C 64/165 |
| 2017/0165913 A1 * | 6/2017 | Diekmann | C08J 3/128 |
| 2020/0229905 A1 | 7/2020 | Ucklemann et al. | |

FOREIGN PATENT DOCUMENTS

| | | | |
|---|---|---|---|
| WO | WO 2003-053102 | 6/2003 | |
| WO | WO 2008-083358 | 7/2008 | |
| WO | WO 2012-078533 | 6/2012 | |
| WO | WO-2012078533 A1 * | 6/2012 | ............. B33Y 30/00 |
| WO | WO 2013-181262 | 12/2013 | |
| WO | WO-2013181262 A1 * | 12/2013 | ........... B29C 64/165 |

* cited by examiner

METHOD OF MAKING A DENTAL ARTICLES

FIELD OF THE INVENTION

The invention relates to a method of making a dental article, for example a dental blank, a dental restoration or a precursor thereof. The invention in more particular relates to a method using a sinter powder based build up process.

BACKGROUND ART

In the field of dentistry, dental restorations, for example replacement teeth, are more and more manufactured in automated processes, which typically include the use of computer-aided design (CAD) techniques and manufacturing by Computer Numerical Controlled (CNC) machines. Further, so-called build-up processes have been proposed for making of dental restorations. Such a build-up process typically allows building up an individual dental restoration in substantially its desired individual shape, generally by subsequently adding material to create that shape instead of providing an oversized standardized blank from which material is removed in a subsequent process.

While build-up processes are meanwhile widely used in the industry for rapid prototyping, the manufacturing of final products in many areas is still challenging. For making dental restorations it is generally required to use materials that are compatible for use in a human body. Further, a dental restoration manufactured by a build-up process must fulfill requirements to mechanical stability as well as expectations about aesthetics, concerning for example color shading and translucency.

For example WO 2012/078533 describes such a build-up process and corresponding devices for making a dental restoration from a powdery ceramic material.

Ceramic materials typically are manufactured in the form of an open porous precursor which subsequently is sintered at high temperatures to provide the ceramic in its final material structure. In the field of sintering of dental ceramics a variety of standard procedures and standard practices have established so that it is desirable to use such procedures and practices in combination with build-up processes.

Although existing processes for making dental restorations are advantageous in different respects there is a general desire to provide a process for making individual or customized dental restorations at a high degree of automation, maximized quality and minimized costs.

SUMMARY OF THE INVENTION

The invention relates to a method of making a dental article. The method comprises the steps of:
(i) providing a layer of sinter powder, the layer having a thickness;
(ii) providing a fluid solidifiable binder to form a circumferential fixation zone having essentially the thickness of the powder layer and being arranged in essentially the same level with the powder layer, wherein the fixation zone encloses a portion of the powder layer; and
(iii) repeating steps (i) and (ii) with each fixation zone of one layer being in contact with a fixation zone of an adjacent layer such that a plurality of the fixation zones together form a coherent hollow sleeve extending across the layers, wherein the corresponding plurality of powder portions in combination form a contiguous batch of powder captured in the sleeve.

The term "batch of powder" may also be referred to as "powder batch" in the following.

The thickness of the powder layer preferably extends in a Z dimension which is a dimension along the dimension of the natural force of gravity on the earth. The powder layer further extends in an X dimension perpendicular to the Z dimension and a Y dimension perpendicular to the Z dimension and the X dimension. Accordingly the dimension X and Y are dimensions in a common plane that is perpendicular to the Z dimension.

The invention is advantageous in that it allows building up a batch of incoherent sinter powder that nevertheless can be handled, for example transported or moved as a whole. Further the invention allows a combination of a build-up process and a common pressing step for compacting the sinter powder. The invention thus helps minimizing efforts and costs in the making of dental articles, in particular dental restorations. Further, the invention allows for providing the dental article with a three-dimensional coloring, in that the dental article can be built up from differently colored powders.

In one embodiment, the layer of sinter powder is provided by filling a cavity of a build-up device with sinter powder. Such cavity is preferably formed by a circumferential border forming side walls of the cavity and a build platform arranged within the border and forming a bottom of the cavity. Therefore the cavity preferably has an opening in a plane parallel to the X and Y dimension and a depth in the Z dimension. The opening is preferably formed by an upper edge of the border. The sinter powder filled in the cavity preferably rests on the platform by natural gravity. Preferably the build platform and the border are movable or positionable relative to each other in the Z dimension. In particular, the build platform may be positionable relative to the border in the Z dimension. The positioning of the build platform is performed by computer control. The position of the build platform can for example be adjusted by a stepper motor which is controlled by a controller. Alternatively or additionally a position measuring system may be provided for measuring the position of the build platform. In this case a servomotor instead of a stepper motor may be used. To provide a layer of sinter powder the build platform is preferably positioned at a predetermined distance under the upper edge of the border. The space between the build platform and the upper edge may be filled with the sinter powder.

The method may further comprise the step of displacing a recoater over the cavity for dispensing sinter powder. Such a recoater may have or may be connected to a sinter powder storage and may have a slide for guiding sinter powder released from the powder storage downwards toward an edge of the slide. The slide may be vibrated to support a flow of the sinter powder toward the slide edge. Preferably the recoater is displaced in a dimension parallel to the X and/or Y dimension. The recoater may be displaced in a stroke consisting of a forward stroke and a return stroke. In the forward stroke the recoater is preferably operated to release sinter powder. In the forward stroke the recoater is preferably displaced at a uniform speed in a direction opposite of the flow of the sinter powder on the slide. In the return stroke the recoater preferably does not release sinter powder. Other recoaters may be used, such as a roller recoater, for example.

In a further embodiment the method may comprise the step of leveling the sinter powder. In particular the recoater may be arranged such that the slide edge slides on or moves shortly above the border of the build-up device. Accordingly any sinter powder extending over the upper edge of the border is automatically leveled or removed by the slide of the recoater during a stroke.

To provide further powder layers the build platform is in each case or consecutively positioned further away from the upper edge of the border by the predetermined distance, and the recoater is displaced over the cavity for dispensing further sinter powder.

The predetermined distance at which the build platform is positioned each time preferably corresponds to the thickness of the powder layer. Thus, a stack of powder layers can be built up incrementally.

In a further embodiment the method comprises the step of using a dispenser for providing the binder to the powder layer. In particular, the method may have the step of using the dispenser for providing the binder to the top most powder layer provided in the cavity. The binder dispenser preferably has an outlet nozzle for the binder. One or more outlet nozzles may be provided, for example in a common print head which is positionable in a controlled manner over the powder layer. The binder dispenser may comprise a storage for the binder. Further the binder dispenser may have heating means for heating the binder prior to dispensation. Such heating means may be arranged adjacent the outlet nozzle, in a supply feed to the nozzle and/or in the storage, as appropriate.

In an embodiment the binder comprises wax or fat, in particular coconut fat. The method may further comprise the step of heating the binder for conversion from the solidified state toward the fluid state. The melting point of the binder may be between 30° C. and 60° C., in particular between 30° and 40° C.

In a further embodiment the binder comprises a hardenable resin, in particular a hardenable elastomer. Such an elastomer may be based on silicones and may for example be light hardenable. An exemplary material is available under the designation LOCTITE® Light Cure Silicones, from the company Henkel Corporation, USA. According to this embodiment the method may further comprise the step of irradiating the binder for conversion from the fluid state toward the solidified state by light and/or heat.

In one embodiment the binder is provided by depositing on the powder layer so as to form the fixation zone by soaking a circumferential portion of the powder layer with the binder. Such a circumferential portion may for example be ring-shaped with the ring extending parallel to the X and Y dimension. Instead of a ring-shape any shape providing a closed contour may be used as appropriate. A molten binder may automatically solidify by cooling toward ambient temperature, for example at about room temperature of 23° C. A hardenable binder may cure from a chemical reaction initiated by irradiation with light of heat, for example. The skilled person will recognize other hardenable materials like for example two-component materials which polymerize in consequence of mixing two or more components.

In one embodiment the method further comprises the step of using the binder to form a base layer and a cover layer. The base layer, the cover layer and the sleeve together preferably form a closed shell which seals the powder batch therein. Accordingly, the base layer and the cover layer each are preferably contiguous layers. These layers may be formed by soaking a contiguous portion of a powder layer with the binder.

In a further embodiment the method further comprises the step of placing the captured powder batch in a bag. Such bag may be formed of a closed plastic bag. The method may further comprise the steps of evacuating the bag and closing the evacuated bag, for example by heat sealing.

In a further embodiment the method further comprises the step of compacting the powder batch by pressing in an isostatic press and thereby forming a precursor of the dental article. The powder batch (captured in the shell) may be placed in hydraulic oil of the press and the oil may be pressurized to cause the sinter powder to compact. The isostatic pressing may be performed at a pressure of between 10 MPa and 1000 MPa in more particular between about 50 MPa and 700 MPa, preferably between about 100 MPa and 400 MPa.

In an embodiment the method further comprises the step of firing the dental article precursor and thereby remove the binder. Thereby the dental article precursor is preferably heated to a temperature of about 500° C. to about 750° C. for a time of up to 96 hours or 120 hours.

In one embodiment, the sinter powder forms the starting material for obtaining a dental ceramic material or a dental glass-ceramic material by sintering. The sinter powder may for example comprise zirconium oxide. The sinter powder may comprise between 90 and 99% by weight zirconium oxide, and preferably 91 to 97.25% by weight zirconium oxide. The sinter powder may further comprise 0-1% by weight aluminum oxide. The sinter powder may also be based on aluminum oxide, meaning the sinter powder may comprise 90 to 99% by weight aluminum oxide and 0 to 1% by weight zirconium oxide. Further the sinter powder may comprise 0-10% by weight of at least one of hafnium oxide, yttrium oxide and oxides from gallium, germanium, cerium and indium. The sinter powder may also comprise 0.0005 to 1.5% by weight of coloring additives, selected from the group consisting of the oxides $Fe_2O_3$, $Tb_2O_3$, $Er_2O_3$ and/or $MnO_2$. The ceramic material of the frame is preferably selected to be compatible for use in human bodies.

The average size of the particles forming the sinter powder as referred to in this specification is typically in a range of about 10 μm to about 60 μm, and preferably about 30 μm. The distribution of the particle size may be for example:

10% of the particles smaller than about 3 μm;
50% of the particles smaller than about 26 μm; and
90% of the particles smaller than about 71 μm.

In more particular the average particle size which the sinter powder referred to in this specification is comprised of may be about 20 μm, for example according to a particle size distribution in which:

10% of the particles are smaller than about 1.2 μm;
50% of the particles are smaller than about 10 μm; and
90% of the particles are smaller than about 45 μm.

In an embodiment the sinter powder is formed of powder particles that are coated with a bonding agent. The bonding agent preferably has a higher temperature stability than the binder. In this regard the term "temperature stability" refers to a maximum temperature in which the bonding agent or the binder still remains in position (for example does not flow away or burn). The bonding agent may further or alternatively have a higher melting point than the binder. The powder particles are preferably coated by a bonding agent made of polyacrylates, polymetacrylates, polyvinylbutyrates, polyvinylalcoholes, methylcellulose, polyethylenglycoles or starch. The bonding agent provides for the sinter powder particles to adhere with each other in consequence of the pressing.

In an embodiment the method further comprises the step of providing the powder layer with a coloring substance. Such coloring substance may be made of coloring iones in a solution, for example Fe, Er, Co, Mn, Tb or coloring pigments, for example oxides or perowskites.

In a further embodiment the method further comprises the step of providing the coloring substance to a determined sub-portion of the portion enclosed by the fixation zone. The method may further comprise the step of providing one or more further coloring substances to determined sub-portions of the portion enclosed by the fixation zone, wherein the coloring substances are configured to exhibit or to convert into different colors.

In one embodiment the method comprises the step of moving a print head for printing a coloring liquid onto the powder layer. For example the build-up device may have one or more print heads for printing the coloring liquid on the top most powder layer. Preferably the coloring liquid(s) and the print head(s) are configured for generating individual droplets from coloring liquid(s) which are soaked by the powder layer. The droplets are preferably adjusted to soak the entire thickness of powder layer with the coloring liquid of the respective droplet. The print head(s) are preferably movable in a plane parallel to the X and Y dimension by computer control. Thus, the coloring liquids are preferably printable to the powder layer in a two-dimensional bitmap pattern. The pattern may be individually selected per powder layer and therefor may vary from powder layer to powder layer. Thus, an individually colored dental article can be provided.

In a further embodiment the method further comprises the step of providing an outer surface of the powder batch with a structure that is indicative of an orientation of the powder batch. Such orientation structure may be used to identify the orientation of the dental article or dental article precursor with respect to the orientation at which it was built-up. This allows for example the determination of the positioning of any color areas in the block, for example for the purpose of machining a dental restoration at a desired area of coloring within the dental article (precursor).

In a further aspect the invention relates to a powder batch of sinter powder. The powder batch is captured in a shell formed of sinter powder embedded in a matrix material. The shell preferably envelopes the powder batch in all three dimensions. Therefore the shell preferably seals the powder batch therein. The powder batch is preferably formed of incoherent powder particles. The matrix material is made of a binder, in particular a wax or fat. The sinter powder and the binder corresponds to the sinter powder and the binder as disclosed with respect to the method of the invention.

DETAILED DESCRIPTION OF THE INVENTION

The following Figures illustrate the method of the invention by way of example. The examples refer to a build-up process using a powder based 3D printer, as for example available under the designation VX500 from the company Voxeljet AG, Germany. The skilled person will recognize other suitable build-up technologies or devices which likewise may be used with the present invention.

Figure 1:
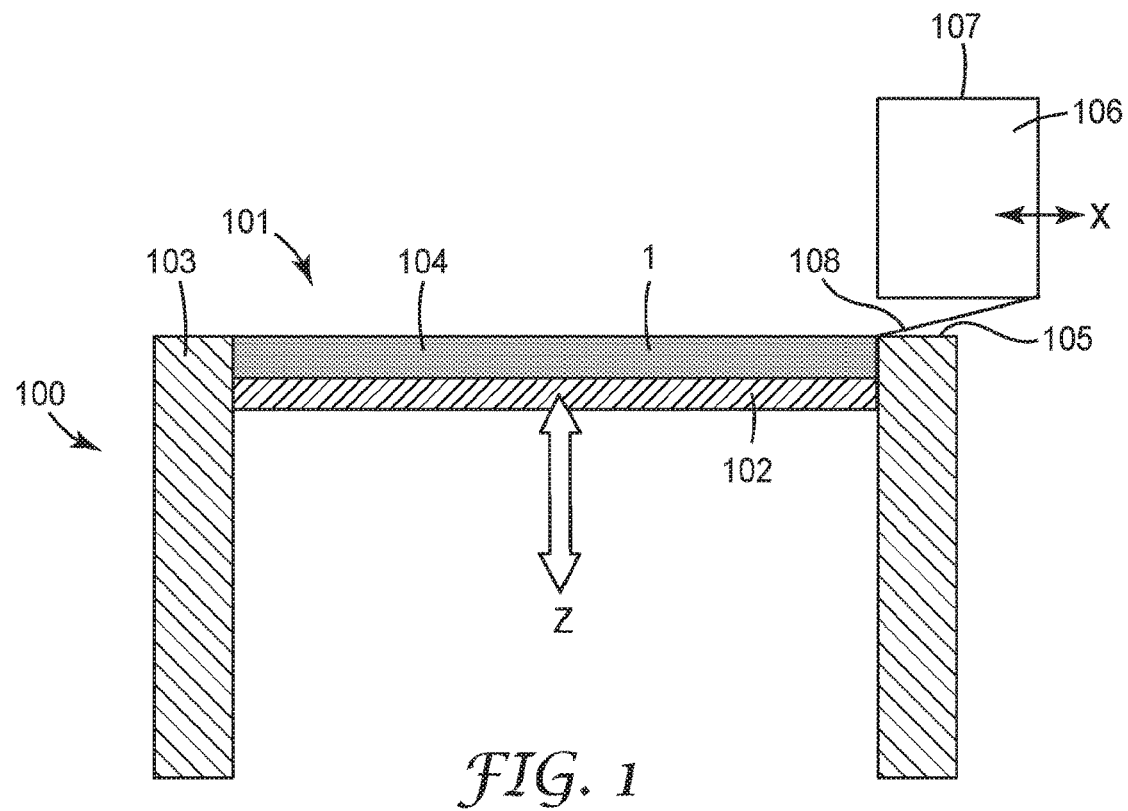
FIG. 1 is a cross-sectional view illustrating a step of a method according to an embodiment of the invention.

FIG. 1 shows schematically a build-up device 100 which has a build-up area 101. The build-up area comprises a build platform 102 which can be vertically (in a Z dimension) positioned to different levels, for example by a positioning device (not shown). The build platform 102 is surrounded by a circumferential border 103. In the illustrated situation the build platform 102 and the border 103 in combination form a cavity 104 which is filled with a sinter powder 1. The build platform 102 and the border 103 form a loose fit with one another, eventually sealed by a woven or non-woven fiber seal, to enable the build platform 102 to move relative to the border 103. Nevertheless the build platform 102 and the border 103 are configured to fit well enough to retain a sinter powder in the cavity 104. In the Figure the build platform 102 is positioned offset from an upper edge 105 of the border 103 by a predetermined distance. This predetermined distance corresponds to the desired thickness of one layer. For filling the cavity 104 the device 100 in the example shown has at least one recoater 106. The recoater 106 has a storage 107 for holding an amount of powder and a scraper 108 for leveling the powder relative to the upper edge 105 of the border 103. The scraper 108 is formed by an edge of a slide which provides for guiding powder from the storage 107 toward the cavity 104. The recoater 106 is movable in an X dimension, preferable at least over the full length of the cavity 104. Further, the recoater 106 has a width in a Y dimension (which is a dimension transverse to the X dimension) which preferably spans the full width of the cavity 104. Thus, a powder layer can be provided by a single stroke of the recoater 106, in the example meaning a movement toward the left and back to the position shown. In the situation shown the powder is incoherent and rests by its weight on the build platform 102.

Figure 2:
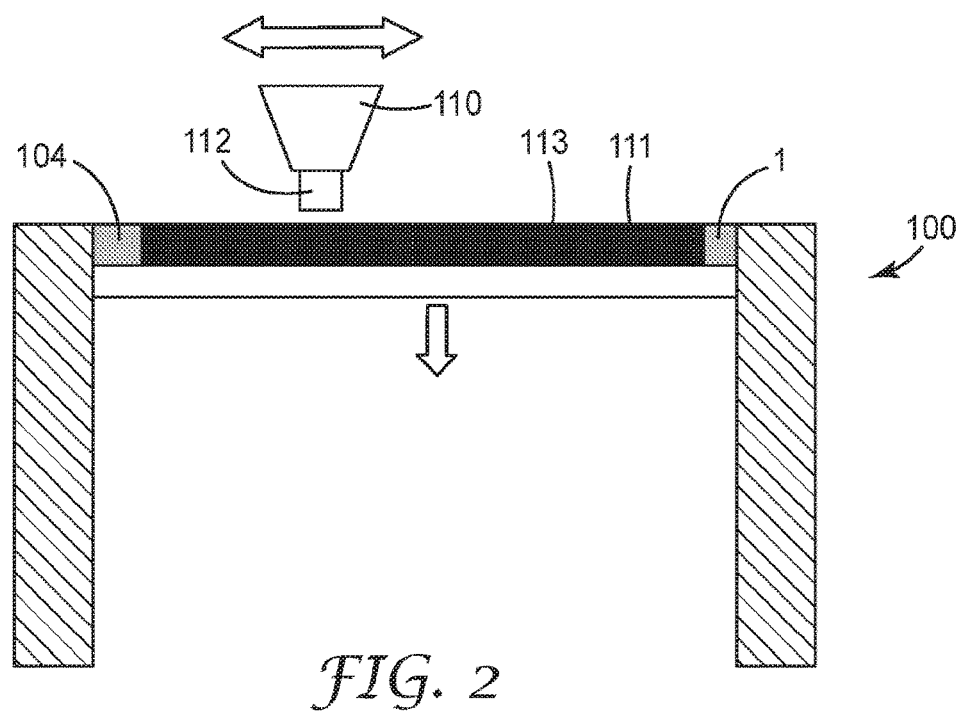
FIG. 2 is a cross-sectional view illustrating a further step of a method according to an embodiment of the invention.

FIG. 2 shows the same device 100. The device has further a dispenser 110 for depositing a fluid binder 111. Preferably, the dispenser is configured to dispense a droplet of fluid binder 111 in a predetermined volume. Further, the dispenser has a nozzle 112 having a predetermined cross-section. The configuration of the dispenser 110 and the nozzle 112 is such that a droplet dispensed on the powder 1 has a predetermined size after soaking into the powder layer. Preferably, the volume of a droplet is large enough to soak the entire thickness of the powder layer with the binder 111. The dispenser 110 is further configured such that it can be positioned in the X and Y dimensions relative to the cavity 104, for example by computer control. Thus, the dispenser 110 is configured to print the binder in a desired shape onto the powder layer. In the example shown a base layer 113 is created by soaking a contiguous portion of the initial powder layer with binder 111. To provide this base layer 113 the dispenser 110 may move in the X dimension and line by line toward the Y dimension of the cavity 104 while the fluid binder 111 is dispensed on the powder 1. In the example the nozzle 112 (and/or another component of the dispenser) is heated for melting the binder prior to dispensing. Further, in the present example coconut fat is used as binder. Coconut fat has a melting point which is between room temperature and temperature of the human body. Therefore, coconut fat can be easily processed at low temperatures. Molten coconut fat has a relatively low viscosity and soaks easily into the powder. Further, coconut fat is environmentally compatible, inexpensive and can be easily and residue-free eliminated from the powder by firing at moderate temperatures.

Figure 3:
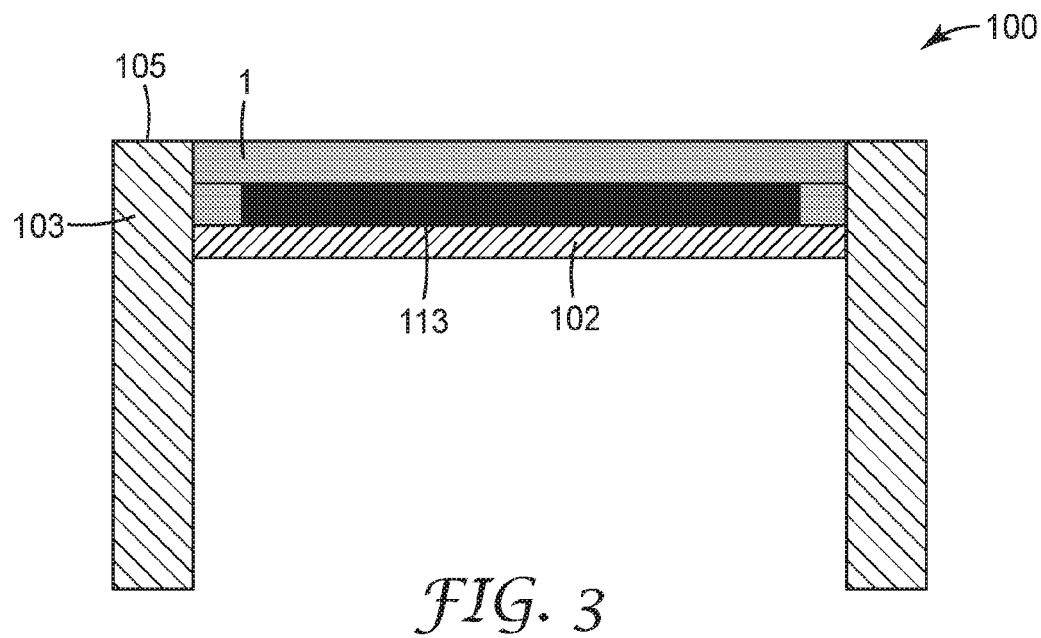
FIG. 3 is a cross-sectional view illustrating a further step of a method according to an embodiment of the invention.

FIG. 3 still shows the same device 100. The build platform 102 is retracted relative to the upper edge 105 of the border 103 by one further layer thickness compared to the situation in FIG. 2. A further layer of powder 1 is deposited on the base layer 113.

Figure 4:
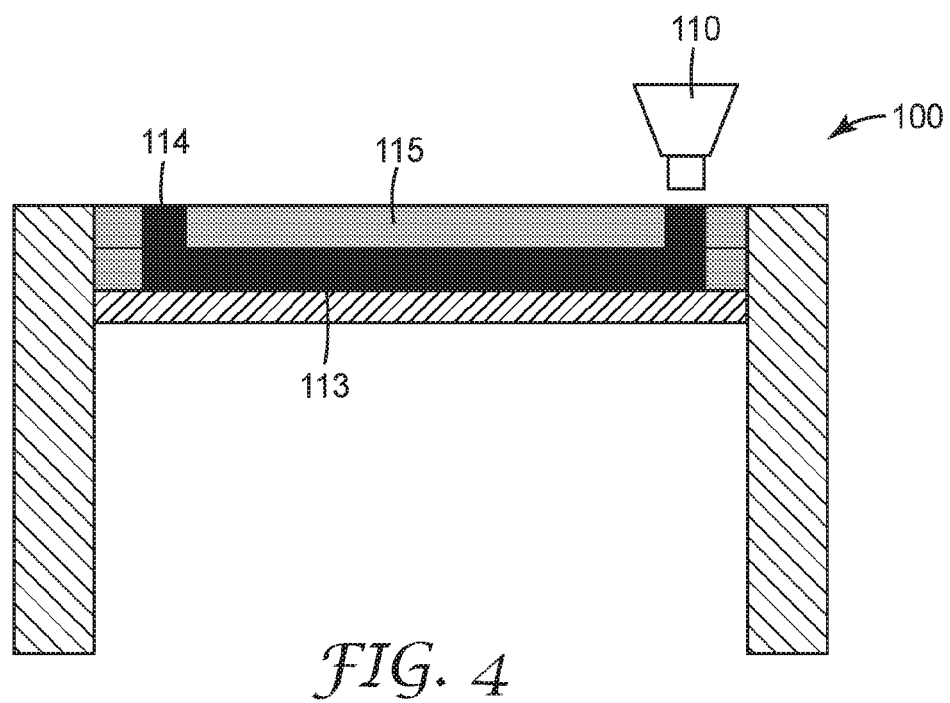
FIG. 4 is a cross-sectional view illustrating a further step of a method according to an embodiment of the invention.
Figure 5:
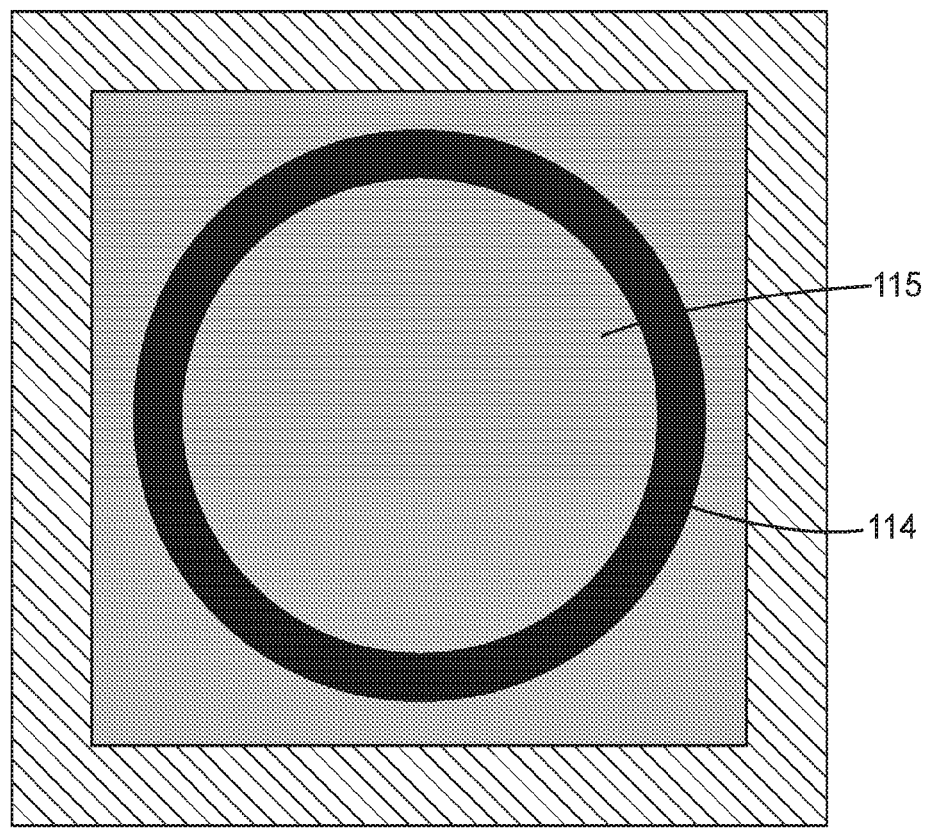
FIG. 5 is a top view of FIG. 4.

In FIG. 4 the device 100 is shown in a situation in which a fixation zone 114 is provided on the top most layer of powder 1. The fixation zone 114 is provided by dispensing the binder (via dispenser 110) in a circumferential pattern as for example illustrated in FIG. 5 which is a top view of FIG. 4. As shown, the fixation zone 114 extends over the entire thickness of the powder layer so that the fixation zone 114 connects to the base layer 113. The fixation zone 114 is also arranged in the same level with the powder layer and thus is essentially flush with the powder layer. This is because the binder soaks into spaces between particles of the powder layer and forms a mechanically stable matrix with the powder once the binder has solidified. The fixation zone 114 further encloses a portion 115 of the powder layer. The portion 115 of the powder layer incoherent and rests by its weight on the base layer 113. The fixation zone 114 captures the powder layer laterally.

Figure 6:
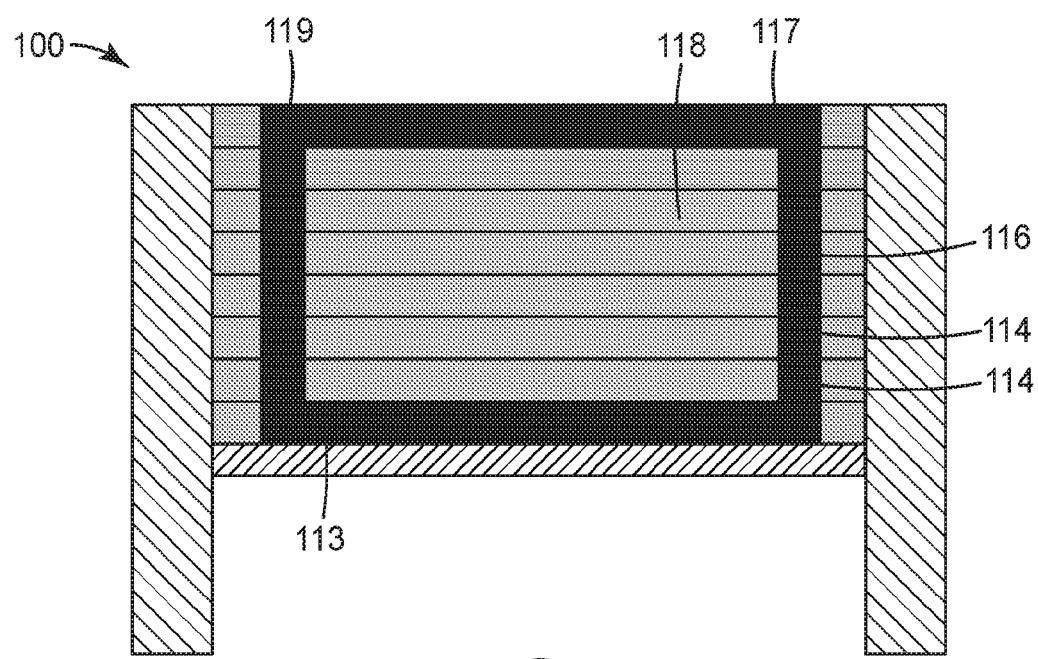
FIG. 6 is a cross-sectional view illustrating a further step of a method according to an embodiment of the invention.

In FIG. 6 a plurality of powder layers and a plurality of fixation zones 114 are provided on top of each other. Each fixation zone 114 of one layer is in contact with a fixation zone 114 of an adjacent layer such that the plurality of the fixation zones 114 together form a coherent hollow and circumferential sleeve 116 extending across the powder layers. Further, a cover layer 117 is provided on the top most powder layer. The sleeve 116 connects on one of its ends with the base layer 113 and on the other of its end with the cover layer 117. Therefore the sleeve 116 in combination with the base layer 113 and the cover layer 117 forms a closed shell 119 which captures a contiguous batch 118 of powder therein. The captured powder batch 118 corresponds to the plurality of powder portions which are enclosed by the fixation zones 114. The powder batch 118 with the shell 119 in the situation shown forms a relatively mechanically stable body which can be handled, for example removed from the device 100 and placed to a location outside the device 100. The powder batch 118 captured in the shell 119 may for example be placed in an isostatic press to compact the powder to cause the powder particles to adhere with one another, and thus to create a coherent powder batch. Such a pressing typically is performed at pressures of about 100 to 150 MPa. The so formed coherent powder batch may form a precursor of the dental article, for example a dental blank from which a dental restoration precursor may be machined. The dental restoration precursor may be finally sintered to form a dental restoration. The shell around the powder batch may be removed by firing below a sinter temperature of the sinter powder and in particular just below a burning temperature of the material the shell is made of. In case coconut fat and zirconium oxide powder is used such a temperature may be below 250° C.-300° C. During pressing the coconut fat prevents the powder particles from directly adhering to each other so that after firing and removing the coconut fat the powder particles automatically fall away from the coherent powder batch. Alternatively, pressing and firing may be performed in directly consecutive steps. In this case, the dental article may be formed instead of a precursor only. Such a dental article may be a dental blank which is sintered to its final density and from which the dental restoration may be machined. In this example the firing step for removing the shell material may be integrated in the sintering process. For example the sintering may start at lower temperatures for removing any binders and continue at higher temperatures to cause the sintering of the powder particles.

Figure 7:
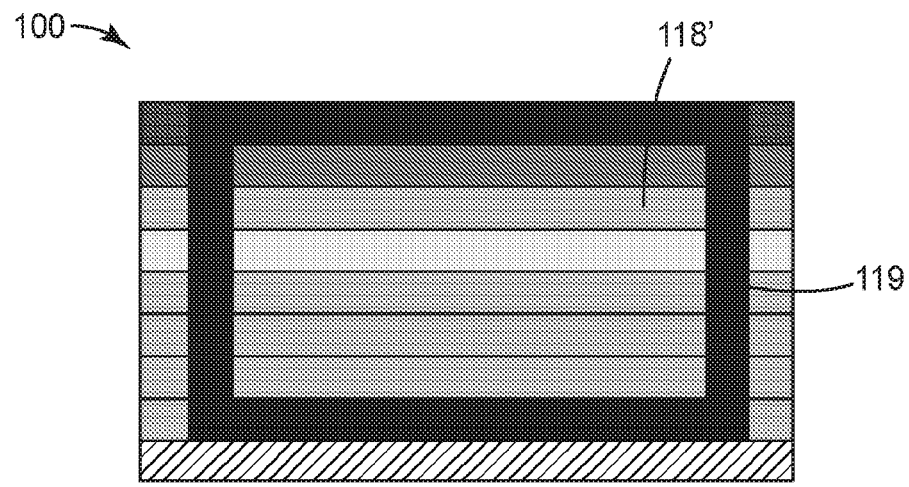
FIG. 7 is a cross-sectional view illustrating a step of a further method according to an embodiment of the invention.

FIG. 7 shows a powder batch 118' in a shell 119 as obtained in a method as described but with individual layers being formed of different sinter powders. Such different sinter powders may have a different color and/or material composition (for example to provide different translucencies and/or mechanical strengths). To provide a powder batch 118' as illustrated, the device 100 may have two or more recoaters (not shown) for selectively providing entire individual layers from different sinter powders. Alternatively or additionally, the device 100 may have one or more print heads each for dispensing a coloring liquid, as schematically illustrated in FIG. 8.

Figure 8:
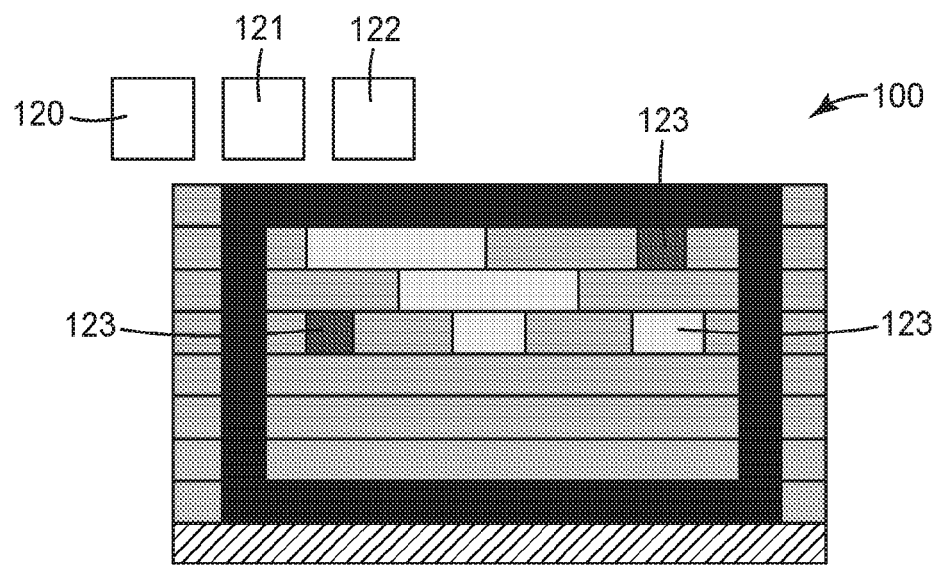
FIG. 8 is a cross-sectional view illustrating a step of a further method according to an embodiment of the invention.

The device 100 in FIG. 8 has a plurality of print heads 120, 121, 122 being configured to dispense different coloring liquids. The skilled person will recognize that the number of print heads may be selected as needed, for example the device 100 may have two, three or more print heads as desired. The print heads 120, 121, 122 are movable in the X and Y dimension, preferably by computer control. Thus, the device 100 is configured to print a pattern into a respective top most layer of sinter powder, for example by printing individual print pixels. The print heads 120, 121, 122 and associated coloring liquids are preferably configured such that the entire thickness of the powder layer can be soaked by the coloring liquid of one pixel. Therefore the device 100 may be used to create a powder batch in which sub-portions 123 of layer portions (portions enclosed by fixation zones) are provided with individual colors.

Figure 9:
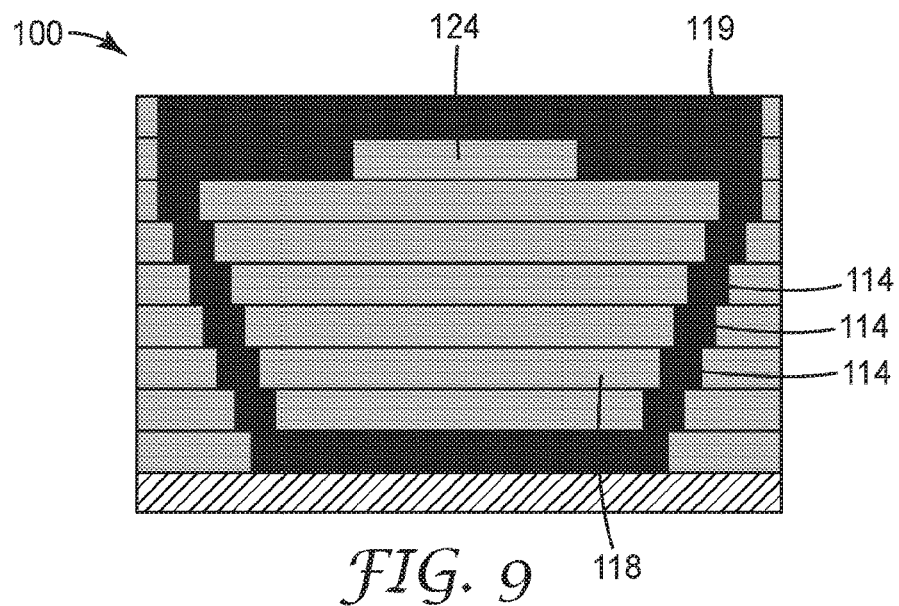
FIG. 9 is a cross-sectional view illustrating a step of a further method according to an embodiment of the invention.

FIG. 9 shows an example in which the individual fixation zones 114 are provided laterally offset (offset in the X/Y dimension) relative to each other but still in contact with each other. This allows the shell 119 to be created at a multiplicity of different shapes. In one example a powder batch 118 may be provided at a shape of an enlarged tooth. After pressing and sintering such a powder batch a dental restoration or precursor thereof may be obtained. The powder batch 118 in the example further has an indication structure 124 which indicates the orientation of the powder batch 118 during its creation. After pressing and after forming a dental article precursor the indication structure 124 provides an indication about the orientation of the dental article precursor. For example, the indication structure 124 may be used to adjust the orientation of the dental article or dental article precursor in a dental milling or grinding machine.

Figure 10:
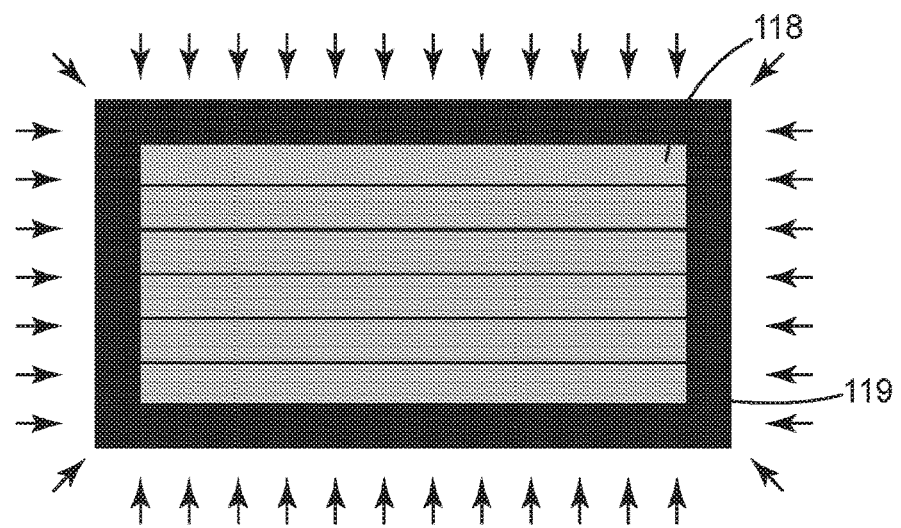
FIG. 10 is a cross-sectional view illustrating a step of a method according to an embodiment of the invention.

FIG. 10 illustrates the isostatic pressing of the powder batch 118 captured within the shell 119. For isostatic pressing the powder batch 118 held in the shell 119 may be additionally placed in a sealed pouch to prevent oil of the press to contaminate the powder. Although isostatic pressing is preferred to achieve a dental article precursor having a relatively uniform material structure, the skilled person will recognize other options of pressing like uniaxial or biaxial pressing as appropriate.

Figure 11:
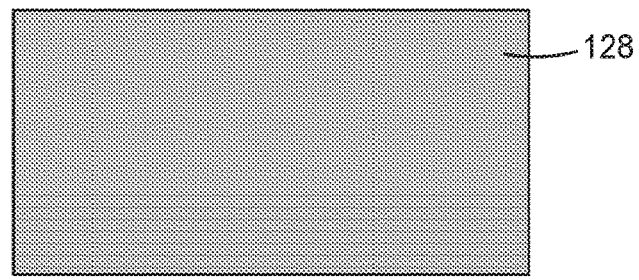
FIG. 11 is a cross-sectional view illustrating a further step of a method according to an embodiment of the invention.

FIG. 11 shows the dental article precursor 128 obtained from pressing the powder batch as illustrated in FIG. 10 and after de-bindering by a firing step for removing the binder of the shell. It is noted that the powder particles may be coated by a bonding agent that provides the particles to adhere. Although such a bonding agent may sometimes be referred to as binder in the technical field of sintering, the present bonding agent preferably is configured to melt at a temperature of above about 400° C. Hence, during de-bindering of the binder used for the shell at about 250° C. to 300° C. the cohesion of the powder particles within the captured powder batch is not affected.

For sintering the dental article precursor the bonding agent may in an initial phase be removed by heating the dental article precursor to a temperature of more than 400° C. to 750° C.

What is claimed is:

1. A method of making a dental article precursor, comprising the steps of:
   providing a base layer comprised of sinter powder and a solidified binder;
   providing a sinter powder layer in contact with the base layer, the sinter powder layer having a thickness;
   heating the solidified binder effective to provide a fluid solidifiable binder, the fluid solidifiable binder comprising coconut fat;
   contacting the fluid solidifiable binder with the sinter powder layer, wherein the fluid solidifiable binder forms a circumferential fixation zone enclosing a portion of the sinter powder layer,
   providing a successive sinter powder layer in contact with an adjacent sinter powder layer;
   contacting the fluid solidifiable binder with the successive sinter powder layer, wherein the fluid solidifiable binder forms a circumferential fixation zone enclosing a portion of the successive sinter powder layer and contacts an adjacent circumferential fixation zone;
   repeating the two immediate preceding steps for a determined number of times to provide a plurality of sinter powder layers that are at least partly enclosed by a plurality of circumferential fixation zones;
   wherein the plurality of circumferential fixation zones together form a coherent sleeve extending across the plurality of sinter powder layers,
   wherein the plurality of sinter powder layers together form a contiguous powder batch within the coherent sleeve, and
   wherein formation of the coherent sleeve provides the dental article precursor.

2. The method of claim 1, further comprising allowing the fluid solidifiable binders to solidify to provide the solidified binders.

3. The method of claim 1, wherein the fluid solidifiable binder comprises a hardenable elastomer.

4. The method of claim 3, further comprising irradiating the fluid solidifiable binder for conversion from a fluid state toward a solidified state by light and/or heat.

5. The method of claim 1, wherein the fluid solidifiable binder is deposited on the sinter powder layer so as to form the circumferential fixation zone by soaking a circumferential portion of the sinter powder layer with the fluid solidifiable binder.

6. The method of claim 1, further comprising providing a cover layer comprised of sinter powder and solidified binder, wherein the base layer, the cover layer and the coherent sleeve together form a closed shell which seals the contiguous powder batch therein.

7. The method of claim 1, further comprising placing the contiguous powder batch in a bag.

8. The method of claim 1, further comprising compacting the contiguous powder batch by pressing in an isostatic press.

9. The method of claim 8, further comprising the step of firing the dental article precursor, thereby removing the binder.

10. The method of claim 1, further comprising sintering the dental article precursor to provide a dental ceramic material or a dental glass-ceramic material.

11. The method of claim 10, wherein the sinter powder layer(s) comprises sinter powder particles that are coated with a bonding agent, wherein the bonding agent has a higher temperature stability than the fluid solidifiable binder.

12. The method of claim 1, further comprising providing the sinter powder layer with a coloring substance.

13. The method of claim 12, further comprising providing the coloring substance to a determined sub-portion of the portion enclosed by the circumferential fixation zone.

14. The method of claim 12, further comprising providing more than one coloring substances to determined sub-portions of the portion enclosed by the circumferential fixation zone, wherein the coloring substances are configured to exhibit or to convert into different colors.

* * * * *